P. G. STRASSMANN.
FURNACE FOR PRODUCTION OF ILLUMINATING GAS.
APPLICATION FILED DEC. 12, 1916.
1,285,833.
Patented Nov. 26, 1918.
2 SHEETS—SHEET 1.
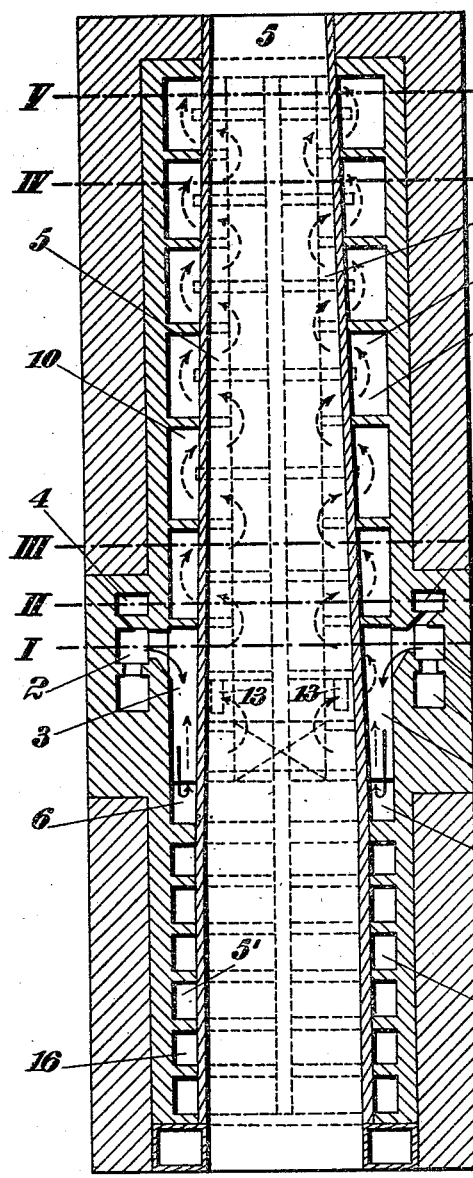
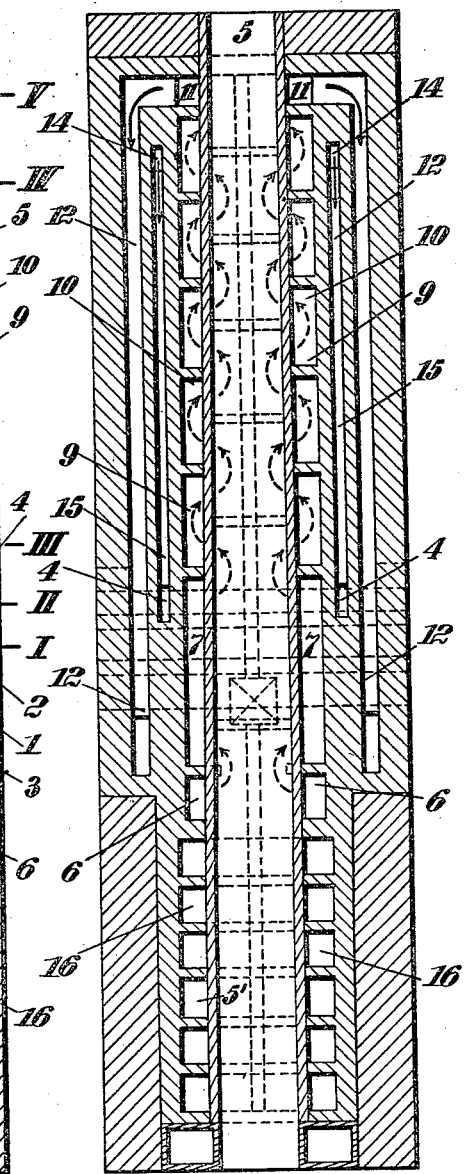
INVENTOR:
P. G. STRASSMANN
BY: H. van Oldenburg
ATTORNEY.

P. G. STRASSMANN.
FURNACE FOR PRODUCTION OF ILLUMINATING GAS.
APPLICATION FILED DEC. 12, 1916.

1,285,833.

Patented Nov. 26, 1918.
2 SHEETS—SHEET 2.

I-I

II-II

IV-IV

III-III

V-V

INVENTOR
P. G. STRASSMANN

BY: H van Oedemus
ATTORNEY.

UNITED STATES PATENT OFFICE.

PAUL GERHARD STRASSMANN, OF CREFELD-LINN-ON-THE-RHINE, GERMANY.

FURNACE FOR PRODUCTION OF ILLUMINATING-GAS.

1,285,833.  Specification of Letters Patent.  Patented Nov. 26, 1918.

Application filed December 12, 1916.  Serial No. 136,422.

*To all whom it may concern:*

Be it known that I, PAUL GERHARD STRASSMANN, a subject of the German Emperor, residing at Crefeld-Linn-on-the-Rhine, Germany, have invented a new and useful Furnace for Production of Illuminating-Gas, of which the following is a specification.

The present invention relates to gas producers for making illuminating gas and consists of the details of construction hereinafter set forth and particularly pointed out in the claims.

In order to render the specification easily intelligible reference is had to the accompanying drawings in which similar numerals of reference denote similar parts throughout the several views.

Figure 1 is a vertical section on line A—B of Fig. 3,

Fig. 2 is a similar section on line C—D of Fig. 4,

Figure 3:
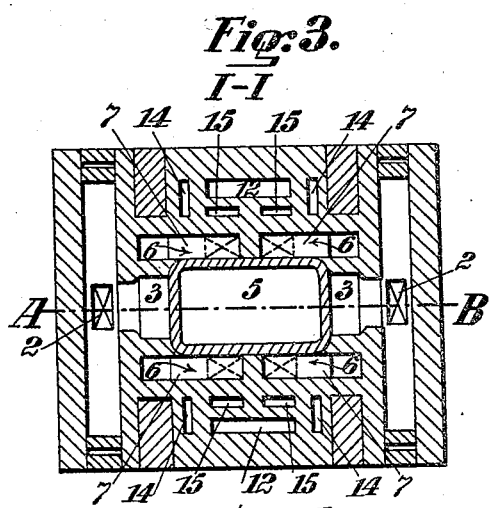
Figs. 3, 4 and 5 are respectively horizontal sections on lines I—I, II—II and IV—IV of Fig. 1.
Figure 4:
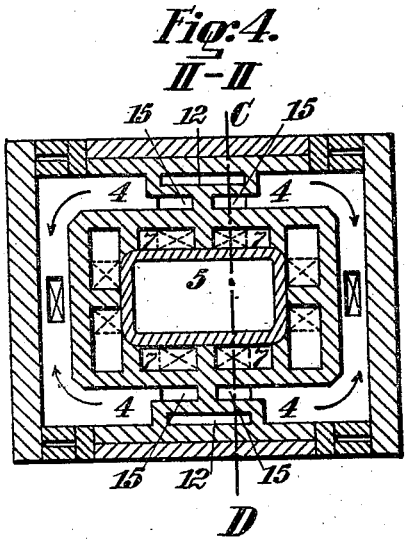
Figure 5:
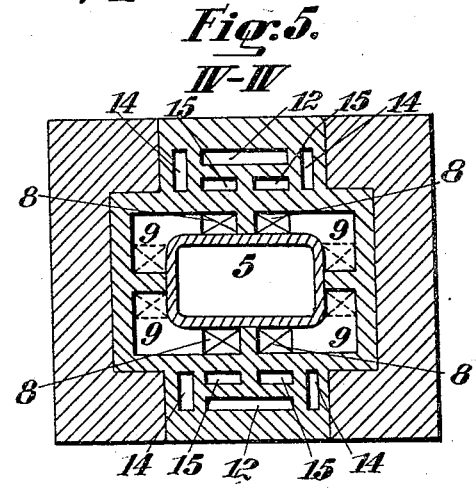
Figure 6:
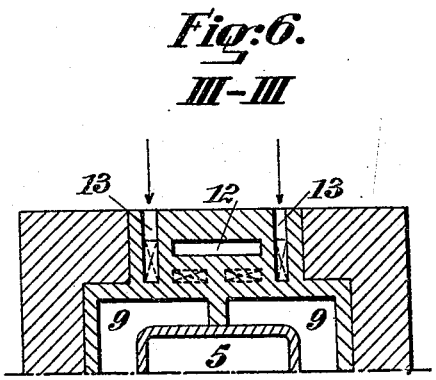
Fig. 6 is a similar section on line III—III of Fig. 1
Figure 7:
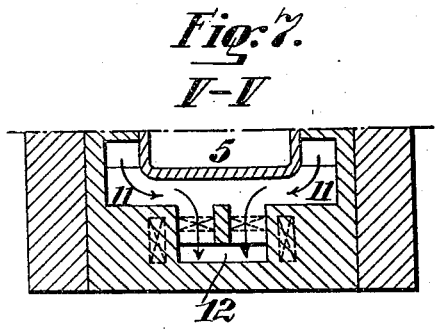
Fig. 7 is a similar section on line V—V of Fig. 1.

The retort 5 is surrounded by brickwork in which the flues are formed. The space around the retort is subdivided by horizontal partitions or partition walls 10 into a series of chambers, the positions of which are staggered as regards each other. The lowermost chamber opens into the flues 7, at the broader sides of the furnace, which communicate with flues 3 at the narrower sides, by means of the channel 6. The flue 3 is in communication with feed channel 4 for the fuel gas and also with the feed air inlet channel 1. The gas and air coming from these channels, meet in the space or flue 2 and the mixture of gas and air thus formed, passes thence to the burners or points of ignition. The burner openings 2ª extend out of the passage 2 and open into the passage 3 extending down the narrower sides of the retort 5, said passages 3 being in communication with flues 7—extending vertically up the broader sides of the retort—by means of horizontal passages 6 (Fig. 3). The passages 7 are in communication with spaces 9 above the burners or ignition zone, by means of vertical passages 8 (Fig. 5). The space 9 is divided, by vertical partition walls into four chambers surrounding the retort 5 as illustrated in Figs. 5–7. The said space 9 is provided, above the burner openings, with intermediate partition walls 10, staggered, as regards each other in the vertical plane, so that the heating gases are forced to take a zig-zag course upwardly through the said space or flue 9, as illustrated by arrows in broken lines in Figs. 1 and 2. The heating gases leave the furnace space 9 through horizontally disposed channels 11 at the top part of the furnace whence they pass downwardly through vertical flues 12 in the furnace walls, to be led off beneath the burner nozzles.

The air for combustion enters at 13 (Fig. 6) and passes through vertically upwardly extending flues 14 in proximity to the space 9 and the main outlet flue 12, and through flues 15 into the common or collecting flue 4, whence they enter the flue 2. This arrangement insures a thorough preheating of the air for combustion, rendering the employment of special recuperators unnecessary.

The extension 5′ of the retorts 5 is not heated but is provided with air or water cooling which may circulate through channels 16 provided for the purpose. At this part of the retort the fuel from which the gas has been extracted will have been sufficiently cooled, so that it may be removed for further use in a warm or cold state.

I claim as my invention:—

1. A furnace for producing gas, comprising a vertically disposed retort and brickwork inclosing the same so as to leave an intermediate space around the said retort, vertical walls, substantially centrally disposed at each side of the retort and extending from the inner face of the brickwork to the retort from top to bottom of the latter, and forming four vertical chambers, and a series of horizontally disposed partition walls within said chambers, said horizontal walls being staggered, so as to form a separate zig-zag passage at each corner of the retort extending from the lower part to the top of the same, vertically disposed return passages from the top of the structure down to outlets at the lower part of the same, a series of ignition openings constituting a burner zone around the retort beneath the lowermost of the staggered chambers and passages communicating between said burner zone and the lowermost of the staggered chambers substantially as described.

2. A furnace for producing gas, comprising a vertically disposed retort and brickwork inclosing the same so as to leave an intermediate space around the said retort, vertical walls, substantially centrally disposed at each side of the retort and extending from the inner face of the brickwork to the retort from top to bottom of the latter, and forming four vertical chambers, and a series of horizontally disposed partition walls within said chambers, said horizontal walls being staggered, so as to form a separate zig-zag passage at each corner of the retort extending from the lower part to the top of the same, vertically disposed return passages from the top of the structure down to outlets at the lower part of the same, a series of ignition openings around the retort beneath the lowermost of the staggered chambers and passages communicating between said burner zone and the lowermost of the said staggered chambers, and a series of passages for water cooling disposed around an extension of the lower end of the retort all in the manner substantially as described.

In testimony whereof I affix my signature in the presence of two witnesses.

PAUL GERHARD STRASSMANN. [L. S.]

Witnesses:
HELEN NUFER,
ALBERT F. NUFER.

Copies of this patent may be obtained for five cents each, by addressing the "Commissioner of Patents, Washington, D. C."